United States Patent Office 2,788,268
Patented Apr. 9, 1957

2,788,268

NOVEL COMPOSITIONS AND THEIR USE

Joseph A. Tursich, Akron, Ohio, assignor to Columbia-Southern Chemical Corporation, Allegheny County, Pa., a corporation of Delaware No Drawing. Application March 17, 1955,
Serial No. 495,034

10 Claims. (Cl. 71—2.6)

This invention relates to novel compositions containing a propynyl N-phenylcarbamate as an essential ingredient. It more particularly pertains to biological active formulations such as herbicidal and fungicidal compositions in which a propynyl N-phenylcarbamate is the active ingredient. It further involves utilizing such compositions in combatting weed growth, protecting plant life against rotting due to fungi, and for other herbicidal and fungicidal purposes.

In accordance with this invention, valuable compositions are provided which contain, as their primary active component, a propynyl N-phenylcarbamate. These carbamates may be depicted by this structural formula:

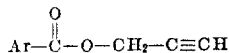

wherein Ar represents the residue of a phenyl amine having its amino nitrogen linked directly to both the phenyl nucleus and the carboxylic carbon atom. Aside from the carbamate radical, the phenyl nucleus may contain from 1 to 5 ring substituents. Thus, the phenyl ring may contain in any combination halogens, preferably chlorine, lower alkyl, alkoxy, and alkenyl groups having from 1 to 4 carbon atoms per group, nitro groups and cyano groups by way of illustration.

Some of the propynyl N-phenylcarbamates include:

Propynyl N-phenylcarbamate
Propynyl N-3-methylphenylcarbamate
Propynyl N-3-chlorophenylcarbamate
Propynyl N-2-methyl-5-chlorophenylcarbamate
Propynyl N-2-methyl-5-methoxyphenylcarbamate
Propynyl N-2,4,5-trichlorophenylcarbamate
Propynyl N-2-chloro-5-ethoxyphenylcarbamate
Propynyl N-2,5-dinitrophenylcarbamate
Propynyl N-3-cyanophenylcarbamate
Propynyl N-ethyl-N-3-chlorophenylcarbamate
Propynyl N-methyl-N-2-methyl-5-ethylphenylcarbamate
Propynyl N-3-allylphenylcarbamate
Propynyl N-2,5-dichloro-4-propylphenylcarbamate
Propynyl N-cyclohexyl-N-3-chlorophenylcarbamate
Propynyl N-phenyl-N-2,5-dipropoxyphenylcarbamate
Propynyl N-methoxy-N-3-methylphenylcarbamate
Propynyl N-2-chloro-4-methyl-5-ethoxyphenylcarbamate Of the above enumerated compounds and the class they represent, those propynyl N-phenylcarbamates derived from primary phenyl amines, e. g. phenyl amines in which two hydrogen atoms are attached to the amino nitrogen, have been found especially effective as active ingredients for the contemplated formulations. In addition, carbamates containing the ring substituents in the meta position, and notably chlorine, are particularly useful. A typical preferred carbamate, therefore, is propynyl N-3-chlorophenylcarbamate.

Compositions containing a propynyl N-phenyl-carbamate have demonstrated utility for a variety of agricultural purposes, notably as aids in combatting weed growth or for other growth regulatory effects on plants. They have demonstrated other biological properties, particularly in protecting fruit, such as citrus fruit, from rotting due to bacteria. In one specialized use, propynyl N-phenylcarbamates such as propynyl N-phenylcarbamate has prevented citrus fruit decay or stem end rot.

Compositions of propynyl N-phenylcarbamates are particularly effective in controlling the growth of narrow leaf plants, e. g. monocotyledons, such as barley and corn. On the other hand, broad leaf plants typified by beans and sunflower are not significantly affected by propynyl N-phenylcarbamates, such as propynyl N-phenylcarbamate. Accordingly, these carbamates are selective in their herbicidal or growth regulatory properties, being effective for combatting monocotyledons, narrow leaf plants or weeds, without injuring materially, if at all, broad leaf crops. In practical utilization, formulations containing these carbamates are suitable for combatting narrow leaf weeds found growing in the presence of broad leaf crops.

The extent of this selectivity is indicated by the following data. In such experiments, formulations containing the specified propynyl N-phenylcarbamate are applied to test plots of the enumerated plants, and the plant growth is carefully observed.

| Chemical | Percent Kill and Inhibition of — | | | | |
|---|---|---|---|---|---|
| | Bean | Sunflower | Cucumber | Barley | Corn |
| Propynyl N-phenylcarbamate | 19 | 25 | 79 | 89 | 88 |
| Propynyl N-3-chlorophenylcarbamate | 27 | 6 | 44 | 88 | 70 |

The above data indicate unusual selectivity against monocotyledons or narrow leaf plants, as exemplified by barley and corn.

Another noteworthy feature of propynyl N-phenylcarbamate formulations is the unusually low concentrations at which they are herbicidally effective. While most herbicides require application of at least about 4 pounds of active ingredient per acre, and often up to 10 or 12 pounds per acre of active ingredient, the propynyl N-phenylcarbamates are effective in their herbicidal action with dosages of substantially lower quantities, such as from about 1 to about 3 pounds of active ingredient per acre.

Thus, according to one embodiment of the present invention, a composition containing a propynyl N-phenylcarbamate is applied to an area cultivated with a broad leaf crop in dosages of from about 1 to about 3 pounds of the propynyl N-phenylcarbamate per acre as an expedient for combatting narrow leaf weed growth. Such treatment may include either post- or pre-emergence application of the formulations. That is, the herbicidally active formulations may be applied prior to the appearance of weed growth or after weed growth has commenced.

Another advantageous property of the propynyl N-phenylcarbamate, particularly as it relates to their effectiveness in weed control, is their low volatility rate in comparison with other recognized herbicidal carbamates such as isopropyl N-phenylcarbamate. A low volatility rate permits retention of the active ingredient in the soil or area to which it is applied for longer time periods. This prolongs the time period over which herbicidal or plant growth regulatory effects are obtained. It quite frequently makes effective weed control possible with but one application of an effective dose of the propynyl N-phenylcarbamate during crop growth.

This comparatively low rate of volatility of propynyl N-phenylcarbamate is demonstrated by the following:

One-inch square pieces of glass cloth (fiber glass No.

128) were conditioned in individual aluminum foil dishes (58 millimeters diameter) for two hours at 100° F. After accurately determining the combined weight of the dish and glass cloth, solutions of the test carbamate were prepared by dissolving 0.5 grams of the carbamate in 10 milliliters of ethyl ether. The glass cloth pieces were then immersed in the carbamate solution and air-dried. Thusly impregnated with the carbamate, the glass cloths were maintained in the aluminum foil dishes at 100° F. for one hour, then accurately weighed to the nearest 0.1 milligram. Subsequently, samples were weighed at regular intervals and the quantity of carbamate loss by volatilization determined. The following table summarizes the results:

*Relative volatility of carbamates at 100° F.*

| Compound | Weight Percent Volatilized after— | | |
|---|---|---|---|
| | 16 hrs. | 48 hrs. | 88 hrs. |
| Isopropyl N-phenylcarbamate | 25.5 | 61.7 | 98.0 |
| Propynyl N-phenylcarbamate | 4.8 | 14.1 | 25.3 |
| Propynyl N-3-chlorophenyl-carbamate | 3.6 | 7.1 | 8.9 |

This data indicates the low volatility of propynyl N-phenylcarbamates in comparison with a recognized herbicide such as isopropyl N-phenylcarbamate.

According to a further embodiment of this invention, formulations containing as their active ingredient propynyl N-phenylcarbamate, may be used as fungicides. Also, formulations with this active ingredient are especially effective in the prevention of fruit decay or rot. Thus, formulations containing propynyl N-phenylcarbamate have been found to successfully prevent citrus fruit decay. Oranges inoculated with diplodia, phomopsis, and penicillium were successfully protected against decay or stem end rot from such bacteria by treatment with an aqueous solution of propynyl N-phenylcarbamate containing approximately 2.5 percent by weight of the carbamate.

According to this invention, suitable formulations containing propynyl N-phenylcarbamates are prepared by dissolving the carbamate in an organic solvent. Satisfactory organic solvents for this purpose include xylene, toluene, benzene, gasoline, the alkyl naphthalenes such as ethyl naphthalene, dimethyl naphthalene, etc. and the various commercial mixtures of such alkalated naphthalenes which are frequently available at low cost. Hydrocarbon solvents, and especially the aralkyl hydrocarbons, are most widely employed. However, other organic solvents which may be present in formulations include lower aliphatic monohydric alcohols such as methanol, isopropanol and propanol, ketones including acetone and methyl-ethyl ketone, ethyl ether, ethylene glycol, Cellosolve, ethyl acetate, cyclohexanone, and like low-boiling oxygen-containing industrial organic solvents containing less than 10 carbon atoms.

Compositions which contain a combination of two or more solvents including an aralkyl hydrocarbon organic solvent and an organic oxygen-containing solvent may comprise the liquid solvent medium for the carbamate. When a combination of an aralkyl hydrocarbon and oxygen-containing solvent is present, the aralkyl hydrocarbon should comprise the major portion of the polysolvent system. A solvent system in which the organic oxygen-containing solvent constitutes about 3 to 45 percent by weight of the organic solvents present contains sufficient aralkyl hydrocarbon.

The propynyl N-phenylcarbamate concentration in the organic solvent system should be adjusted such that it contains approximately one to three pounds of carbamate per gallon. This carbamate concentration facilitates formulation of the ultimate aqueous composition as it is applied to the crop. As will become more apparent, one of the primary modes of field application involves spraying aqueous dispersions or solutions of the propynyl N-phenylcarbamate organic solvent solution. If the propynyl N-phenylcarbamate concentration is adjusted in the organic formulation prior to water dilution in a quantity equivalent to the dosage per acre, it is a simple matter to accurately control the dosage.

When dispersions or solutions of the propynyl N-phenylcarbamate are to be field applied, the organic liquid carbamate composition is advantageously formulated to facilitate preparation and stability of the ultimate aqueous dispersion or solution. For example, selection of an organic solvent medium which has a density substantially below that of water such that when admixed with the carbamate, an organic solution having a density approximating that of water is achieved, e. g. when the organic solution is within from plus to minus 5 percent of the density of water, mitigates against settling out of the organic phase, with suitable wetting agent present in the water dispersion.

As much as from 10 to 30 percent dispersing or wetting agent by weight of the carbamate and organic solvent may be required to insure suitable dispersibility. Of course, if the organic solvent is water soluble and the carbamate is still sufficiently soluble upon water dilution, the wetting agent is unnecessary.

Typical formulations of the propynyl N-phenyl-carbamates prior to dispersion in water are as follows.

*Formulation I*

| Component | Weight Percent of Composition |
|---|---|
| Propynyl N-phenylcarbamate | 25.6 |
| Atlox 20 3* | 12.8 |
| Isopropanol | 2.1 |
| Xylene | 59.4 |

*Formulation II*

| Component | Weight Percent of Composition |
|---|---|
| Propynyl N-3-chlorophenylcarbamate | 43.7 |
| Atlox 2033* | 11.0 |
| Isopropanol | 1.9 |
| Cyclohexanone | 43.5 |

*A commercial wetting agent sold by the Atlas Powder Company, which is a sulphonated oil plus mixed polyoxylene sorbitol esters of mixed fatty and resin acids.

The above organic formulations are readily dispersed in water. When so dispersed in water, the carbamate concentration is preferably set at from 0.2 to 3.0 percent by weight of the total composition. It is in this concentration that the formulation is usually applied as a heribicide or fungicide.

In those instances in which the propynyl N-phenylcarbamates are to be used in the solid state, solid formulations are prepared by blending with an inert finely divided inorganic solid. Spray application of solid herbicidal formulations as dusts comprise the primary use of solid compositions. Dusts are in the form of finely divided particles, usually below about 200 mesh, and contain a carbamate concentration of about 0.5 to 3 or possibly 5 percent by weight of the total formulation.

In one technique, solid propynyl N-phenylcarbamate compositions are provided by spraying the carbamate either as a solution or in molten state upon a highly absorptive inert diluent such as highly absorptive silica. Preferably, this absorptive diluent is finely divided, as below 200 mesh. Thereafter, the carbamate impregnated highly absorptive carrier is further diluted to the ultimate carbamate concentration by blending with additional inert solid diluent, again notably those which are finely divided, usually being less than 200 mesh.

Illustrative inert solid diluents of the herein contemplated character include the finely divided silicas, the various finely divided silicates and mixed silicates, notably the metallic silicates such as calcium silicate, aluminum silicate, calcium-aluminum silicate, magnesium silicate, as well as the various naturally occurring clays, pulp, wood flour, bentonite, finely divided calcium carbonate, etc.

The present application is a continuation-in-part of my prior application Serial No. 434,340, filed June 3, 1954.

Although the present invention has been described with reference to specific details of particular embodiments, it is not intended that the invention be construed as being limited thereto except insofar as the limitations appear in the appended claims:

I claim:

1. A composition comprising propynyl N-3-chlorophenylcarbamate and an inert carrier therefor, wherein the carbamate is present in a biologically active concentration.

2. A herbicidal composition comprising a propynyl N-phenylcarbamate, an inert organic liquid solvent therefor, and water wherein the carbamate comprises from about 0.2 to 3.0 percent by weight of the total formulation.

3. A herbicidal composition comprising propynyl N-phenylcarbamate, an inert organic liquid solvent therefor, and water wherein the carbamate comprises from about 0.2 to 3.0 percent by weight of the total formulation.

4. A herbicidal composition comprising propynyl N-3-chlorophenylcarbamate, an inert organic liquid solvent therefor, and water wherein the carbamate comprises from about 0.2 to 3.0 percent by weight of the total formulation.

5. A method of combatting narrow leaf weeds which comprises applying a herbicidal concentration of a propynyl N-phenylcarbamate to the area in which growth of narrow leaf weeds is to be controlled.

6. A method of combatting narrow leaf weeds which comprises applying a herbicidal concentration of propynyl N-phenylcarbamate to the area in which the growth of narrow leaf weeds is to be controlled.

7. A method of combatting narrow leaf weeds which comprises applying a herbicidal concentration of propynyl N-3-chlorophenylcarbamate to the area in which growth of narrow leaf weeds is to be controlled.

8. A method of combatting narrow leaf weeds in a field or broad leaf crops which comprises applying to said field a herbicidal concentration of a propynyl N-phenylcarbamate.

9. A method of combatting the growth of narrow leaf weeds in a broad leaf crop which comprises applying to the field of broad leaf crop from 1 to 3 pounds per acre of a propynyl N-phenylcarbamate.

10. A method of combatting the growth of narrow leaf weeds in a broad leaf crop which comprises applying to the field of broad leaf crop from 1 to 3 pounds per acre of propynyl N-phenylcarbamate.

References Cited in the file of this patent

UNITED STATES PATENTS 2,695,225    Witman    Nov. 23, 1954

FOREIGN PATENTS 574,995    Great Britain    Jan. 30, 1946

OTHER REFERENCES

Beilstein's: "Handbuch der Organische Chemie," vol. 12, p. 325 (1929).

"Weeds," vol. 2, January 1953, pp. 43 to 65.

UNITED STATES PATENT OFFICE

CERTIFICATE OF CORRECTION

Patent No. 2,788,268                                              April 9, 1957

Joseph A. Tursich

It is hereby certified that error appears in the printed specification of the above numbered patent requiring correction and that the said Letters Patent should read as corrected below.

Column 6, line 12, for "field or" read -- field of --.

Signed and sealed this 14th day of January 1958.

(SEAL)
Attest:

KARL H. AXLINE
Attesting Officer

ROBERT C. WATSON
                                                                             Commissioner of Patents